United States Patent
Smith et al.

(10) Patent No.: US 9,914,054 B2
(45) Date of Patent: Mar. 13, 2018

(54) DISPLAY OF SYSTEM-LEVEL ACHIEVEMENTS WITH REAL-TIME UPDATING

(71) Applicant: Microsoft Technology Licensing, LLC, Redmond, WA (US)

(72) Inventors: Robert M. Smith, Seattle, WA (US); Zane W S Teh, Redmond, WA (US); Nathan Johnson, Bellevue, WA (US); Mengyuan Tu, Seattle, WA (US); Mitch A. Johnson, Seattle, WA (US); Casey Baker, Seattle, WA (US); Eric Cancino, Seattle, WA (US); Cierra D. McDonald, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 14/489,379

(22) Filed: Sep. 17, 2014

(65) Prior Publication Data

US 2015/0352444 A1    Dec. 10, 2015

Related U.S. Application Data

(60) Provisional application No. 62/009,205, filed on Jun. 7, 2014.

(51) Int. Cl.
*A63F 9/24*     (2006.01)
*A63F 13/00*    (2014.01)
(Continued)

(52) U.S. Cl.
CPC .............. *A63F 13/46* (2014.09); *A63F 13/35* (2014.09); *A63F 13/537* (2014.09); *A63F 13/69* (2014.09);
(Continued)

(58) Field of Classification Search
CPC ........ A63F 13/46; A63F 13/35; A63F 13/357; A63F 13/69; A63F 13/798
See application file for complete search history.

(56) References Cited

U.S. PATENT DOCUMENTS 8,262,472 B2 *   9/2012   Ostergren .............. A63F 13/10
                                                463/30
8,282,491 B2    10/2012   Auterio et al.
(Continued)

OTHER PUBLICATIONS

"International Search Report & Written Opinion Received for PCT Application No. PCT/US2015/034320", dated Sep. 2, 2015, 13 Pages.
(Continued)

*Primary Examiner* — Kevin Y Kim

(57) ABSTRACT

Examples of the disclosure provide real-time display of achievements to a user during gameplay. A computing device receives a request from a user to display a portion of achievement data describing performance of the user in a gaming application. Responsive to the received request, the achievement data is filtered based on contextual criteria. The filtered achievement data is provided to a user interface for display during gameplay. The displayed achievement data is updated by the computing device updates during gameplay. The achievement data may be system-level achievement data. Further, the achievement data may be displayed on another computing device.

20 Claims, 8 Drawing Sheets

(51) Int. Cl.
| | |
|---|---|
| G06F 17/00 | (2006.01) |
| G06F 19/00 | (2011.01) |
| A63F 13/46 | (2014.01) |
| A63F 13/35 | (2014.01) |
| A63F 13/537 | (2014.01) |
| A63F 13/69 | (2014.01) |
| A63F 13/798 | (2014.01) |

(52) U.S. Cl.
CPC ....... *A63F 13/798* (2014.09); *A63F 2300/209* (2013.01)

(56) References Cited

U.S. PATENT DOCUMENTS

| | | | | |
|---|---|---|---|---|
| 8,400,436 | B1* | 3/2013 | Kuck | H04H 60/06 345/204 |
| 8,469,805 | B2* | 6/2013 | Kilgore | A63F 13/12 273/138.1 |
| 8,535,149 | B2 | 9/2013 | Ziegler et al. | |
| 2003/0096605 | A1* | 5/2003 | Schlieben | H04L 12/583 455/419 |
| 2006/0287099 | A1* | 12/2006 | Shaw | A63F 13/12 463/42 |
| 2007/0117617 | A1* | 5/2007 | Spanton | A63F 13/12 463/29 |
| 2012/0004026 | A1 | 1/2012 | Vann | |
| 2012/0150759 | A1 | 6/2012 | Tarjan | |
| 2014/0038701 | A1 | 2/2014 | Allen et al. | |

OTHER PUBLICATIONS

"Game Center Programming Guide", Available at <<http://wayback.archive.org/web/20121119095908/https://developer.apple.com/library/ios/documentation/NetworkingInternet/Conceptual/GameKit_Guide/GameKit_Guide.pdf>>, Published on Sep. 19, 2012, 143 Pages.

"World of Warcraft Mobile Armory", Available at <<https://www.appannie.com/apps/ios/app/world-of-warcraft-mobile-armory/, Published on: Jun. 2, 2015, 6 Pages.

Tuhljin, "AchievementsReminder", Available at <<https://web.archive.org/web/20140526004828/http://www.curse.com/addons/wow/AchievementsReminder#t1:screenshots>>, Published on: May 26, 2014, 1 Page.

Tuhlijin, "Overachiever—Achievement Tools and Tweaks", Available at <<https://web.archive.org/web/20140524055345/http://www.curse.com/addons/wow/overachiever#screenshots>>, Published on: May, 24, 2014, 3 Pages.

"World of Warcraft Programming: A Guide and Reference for Creating WoW Addons", Available at <<https://web.archive.org/web/20140407012748/http://wowprogramming.com/docs/api_categories>>, Published on: Apr. 7, 2014, 112 Pages.

"Xbox One Achievements, Challenges and Progress", Published on: Nov. 29, 2013 Available at: http://www.trueachievements.com/n15549/xbox-one-achievements-challenges-and-progress.htm, 3 pages.

Lewis, et al., "Features of Achievement Systems", In 18th International Conference on Computer Games: AI, Animation, Mobile, Interactive Multimedia, Educational & Serious Games, Jul. 30, 2013, 8 pages.

"Achievements", Published on: Jun. 3, 2014 Available at: https://developer.apple.com/library/ios/documentation/NetworkingInternet/Conceptual/GameKit_Guide/Achievements/Achievements.html, 13 pages.

"Top 50 Most Won Achievements", Retrieved date: Jul. 30, 2014 Available at: http://www.trueachievements.com/popularachievements.aspx>>, 4 pages.

"TrueAchievements FAQ—Start Here", Retrieved date: Jul. 30, 2014 Available at: www.trueachievements.com/forum/viewthread.aspx?threadid=137018>>, 5 pages.

Caveman, Captain, "Kongregate Sidebar 1.5.12", Published on: Mar. 14, 2012 Available at: https://addons.mozilla.org/en-US/firefox/addon/kongregate-sidebar, 4 pages.

"Second Written Opinion Issued in PCT Application No. PCT/US2015/034320", dated May 18, 2016, 11 Pages.

ToloDK, "The Overachiever Addon—World of Warcraft", Retrieved From <<https://www.youtube.com/watch?v=uXh4tSbx9Vo>>, Jun. 6, 2010, 2 Pages.

"Achievement (Video Gaming)", Retrieved from <<https://en.wikipedia.org/w/index.php?title=Achievement_(video_gaming)&oldid=605208484>>, Apr. 21, 2014, 3 Pages.

Snyder, Craig, "Get Trading Cards on Steam Without Actually Running the Game", Retrieved from <<http://www.makeuseof.com/tag/get-trading-cards-on-steam-without-actually-running-the-game/>>, May 20, 2014, 5 Pages.

"International Preliminary Report on Patentability Issued in PCT Application No. PCT/US2015/034320", dated Aug. 30, 2016, 12 Pages.

Hartrell, "Introducing Google Play game services", May 15, 2013, 4 pages, Retrieved from: https://developers.googleblog.com/2013/05/introducing-google-play-game-services.html.

Achievements, Google Play Games Services, Apr. 4, 2017, 8 pages, Retrieved from: https://developers.google.com/games/services/common/concepts/achievements.

"Make achievement with over 10,000 steps using Google Play Game Api", May 25, 2013, 1 page, Retrieved from: https://stackoverflow.com/questions/16751649/make-achievement-with-over-10-000-steps-using-google-play-game-api.

Achievements, Google APIs for Android, Aug. 14, 2017, 14 pages, Retrieved from: https://developers.google.com/ android/reference/com/google/android/gms/gamesiachievement/Achievement.

"Google play games services—Achievement point", Dec. 8, 2013, 1 page, Retrieved from: https://stackoverflow.com/questions/20457333/google-play-games-services-achievement-point.

"Integrating Google Play services achievements and android notifications", Nov. 20, 2013, 1 page, Retrieved from: https://stackoverflow.com/questions/20089592/integrating-google-play-services-achievements-and-android-notifications.

"Google Play Game Services unlock achievement—store unlock in game or call unlock() every time?", May 24, 2014, 1 page, Retrieved from: https://stackoverflow.com/questions/23848014/google-play-game-services-unlock-achievement-store-unlock-in-game-or-call-unlo/23853222#23853222.

Moss, "40+ Stellar Games That Use Google's Play Game Services", Oct. 21, 2013, 25 pages, Retrieved from: http://android.appstorm.net/roundups/games-roundups/40-stellar-games-that-use-googles-play-game-services/.

Moir, "Stick Stunt Biker 2—Android Apps on Google Play", Jun. 8, 2017, 1 page, Retrieved from: https://play.google.com/store/apps/details?id=com.djinnworks.StickStuntBiker2.free.

"Achievement (video gaming)", Wikipedia, Aug. 29, 2017, 5 pages, Retrieved from: https://en.wikipedia.org/wiki/Achievement_(video_gaming).

"Leaderboards, Achievements, and Challenges", Jun. 13, 2016, 23 pages, Retrieved from: https://developer.apple.com/library/content/documentation/NetworkingInternet/Conceptual/GameKit_Guide/Achievements/Achievements.html#//apple_ref/doc/uid/TP40008304-CH7.

Usher, "Top 10 iOS games with Game Center", Oct. 24, 2011, 7 pages, Retrieved from: http://www.pocketgamer.co.uk/r/iPhone/Top+10+iPhone+charts/feature.asp?c=34588.

"GKAchievement", 2017, 6 pages, Retrieved from: https://developerapple.com/documentation/gamekit/gkachievement.

"GKAchievement", Dec. 6, 2011, p. 1, Retrieved from: https://developer.apple.com/library/content/samplecode/GKAchievements/Introduction/Intro.html.

"loadAchievemntsWithCompletionHandler: Loads previously submitted achievement progress for the local player from Game Center", 2017, 2 pages, Retrieved from: https://developer.apple.com/documentation/gamekit/gkachievement/1520748-loadachievementswithcompletionha.

(56) References Cited

OTHER PUBLICATIONS

"Game Center achievement unlocking multiple times", Aug. 1, 2012, 1 page, Retrieved from: https://stackoverflow.com/questions/11767052/game-center-achievement-unlocking-multiple-times.

"Announcing Amazon GameCircle—A New Gaming Experience for Kindle Fire", Jul. 10, 2012, 6 pages, Retrieved from: https://developer.amazon.com/blogs/post/Tx1SYB9LZMISN02/Announcing-Amazon-GameCircle-A-New-Gaming-Experience-for-Kindle-Fire.html.

"Implementing Achievements with GameCircle", 2010, 7 pages, Retrieved from: https://developer.amazon.com/docs/gamecircle/achievements.html.

"How Does Amazon GameCircle Work?", 2010, 12 pages, Retrieved from: https://developer.amazon.com/docs/gamecircle/how-does-gamecircle-work.html.

Amazon GameCircle, 1996, 9 pages, Retrieved from: https://www.amazon.com/b?node=5930846011.

\* cited by examiner

"Unlocked"

"Locked"

DISPLAY OF SYSTEM-LEVEL ACHIEVEMENTS WITH REAL-TIME UPDATING

CROSS-REFERENCE TO RELATED APPLICATION

This application claims the benefit of U.S. Provisional Application No. 62/009,205, filed Jun. 7, 2014, the entirety of which is hereby incorporated by reference herein.

BACKGROUND

In some existing systems, an achievement includes a reward that a user earns for completing certain actions in a gaming application. Achievements are sometimes difficult or time consuming to accomplish, but rewarding to users due to the rewards they provide to players. Some existing systems display overall achievements of the user from the last game, or game statistics from the current game. However, in these existing systems, the displayed achievements may not be relevant to a current context of the user playing the game application. For example, while the user is playing in level two, achievements from level one may be displayed. Further, the displayed achievements in the existing systems often take up valuable screen space and reduce the visible portion of the game being played. For example, the achievements are displayed within the game playing screen (e.g., the achievements overlap the game playing screen).

SUMMARY

Examples of the disclosure provide real-time updated display of achievements to a user during gameplay. A computing device receives a request from a user to display a portion of achievement data describing performance of the user in a gaming application. Responsive to the received request, the achievement data is obtained and filtered based on contextual criteria. The filtered achievement data is provided to a user interface for display during gameplay. The displayed achievement data is updated by the computing device updates during the gameplay.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
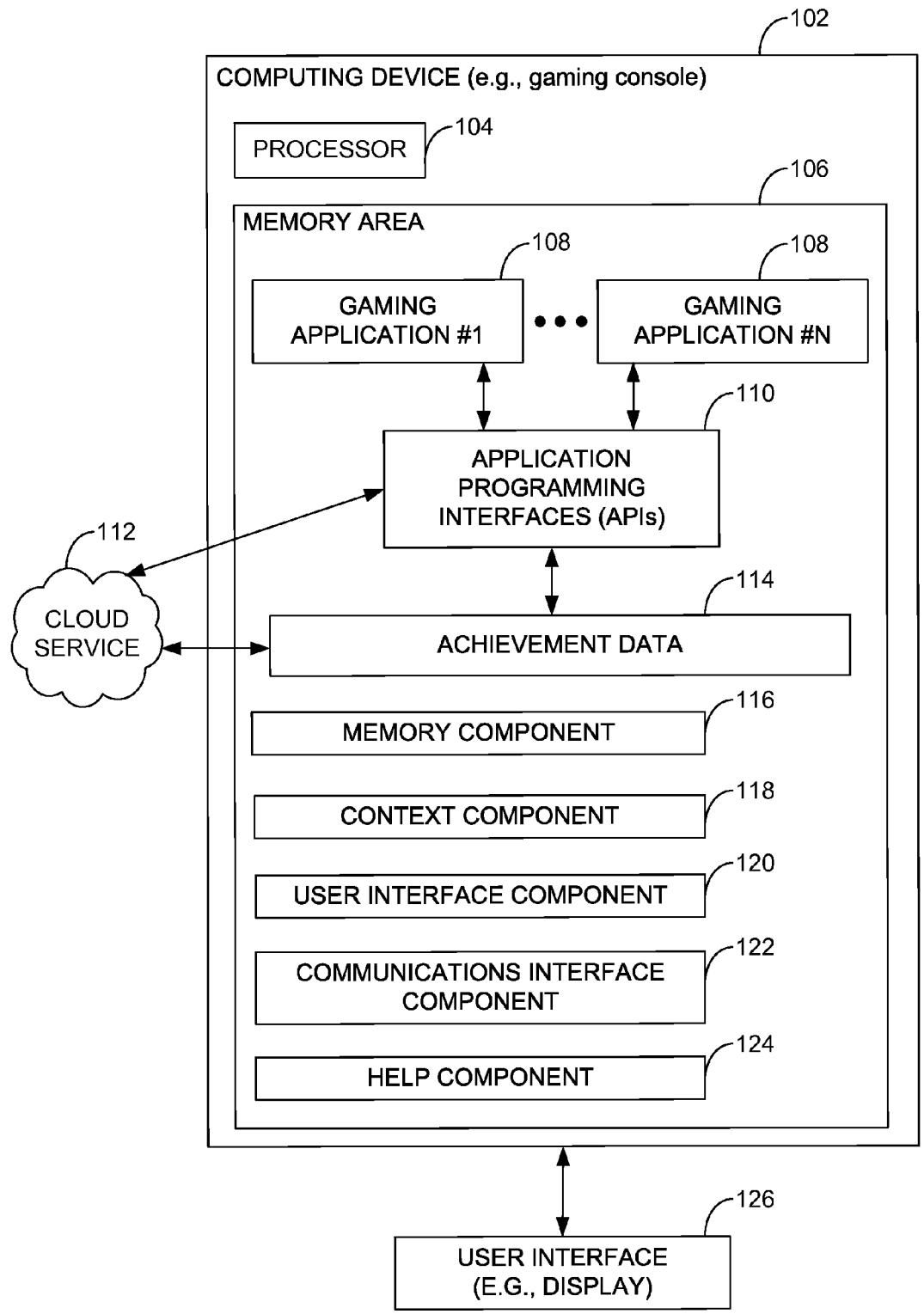
FIG. 1 is an exemplary block diagram illustrating a computing device displaying updated achievement data during gameplay.

Referring to the figures, examples of the disclosure update displayed achievement data 114 describing performance of a user during gameplay. The achievement data 114 comprises data describing a set of achievements and user progress related to the set of achievements. In some examples, a request is received from a user to display at least a portion of the achievement data 114 during gameplay. Responsive to the received request, the requested portion of achievement data 114 is provided to a user interface 126 for display during the gameplay. The displayed achievement data 114 in the user interface 126 is further updated during the gameplay. The achievement data 114 may be displayed and/or updated in real-time, without the user manually refreshing an achievement portion 504 of the user interface 126. For example, the achievement data 114 (e.g., achievement progress for the achievements) relevant to a current game environment is displayed in real-time (e.g., on level two in a game, achievement progress relevant for level two achievements is displayed). In some examples, the achievement data 114 may be displayed outside an execution context of a gaming application 108. For example, the achievement data 114 may be displayed in an achievement application on a computing device different from the computing device 102 that displays the gaming application 108. Further, the displayed achievement data 114 may be system-level achievement data 114 (e.g., consolidated achievement data 114 from a plurality of gaming applications or other applications).

Aspects of the disclosure further enable a better user experience during gameplay as the user may make informed moves or decisions with the displayed achievement data 114 in mind. In this way, aspects of the disclosure improve user efficiency via the user interface interaction. For example, the user need not manually refresh the achievement data 114, as the system automatically updates the achievement data 114 during gameplay and responsive to the current context of the gameplay (e.g., based on level, map, time, progress, performance of other players, etc.). Further, elimination of refresh interactions by the user reduces power consumption by the computing device 102. In some examples, the achievement data 114 may be displayed on another computing device (e.g., different from the computing device 102 displaying the gaming application 108). In these examples, more space is available on the computing device 102 for displaying the gaming application 108 and the achievement data 114 is also clearly visible (e.g., on another computing device).

Referring again to FIG. 1, an exemplary block diagram illustrates a computing device 102 displaying updated achievement data 114 during gameplay. In the example of FIG. 1, the computing device 102 associated with a user represents a system for updating the displayed achievement data 114 during gameplay. The computing device 102 represents any device executing instructions (e.g., as application programs, operating system functionality, or both) to implement the operations and functionality associated with the computing device 102. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, and gaming consoles. Additionally, the computing device 102 may represent a group of processing units or other computing devices.

In some examples, the computing device 102 has at least one processor 104, a memory area 106, and at least one user interface 126. The processor 104 includes any quantity of processing units, and is programmed to execute computer-executable instructions for implementing aspects of the disclosure. The instructions may be performed by the processor 104 or by multiple processors within the computing device 102, or performed by a processor external to the computing device 102. In some examples, the processor 104 is programmed to execute instructions such as those illustrated in the figures (e.g., FIGS. 2, 3, and 4).

In some examples, the processor 104 represents an implementation of analog techniques to perform the operations described herein. For example, the operations may be performed by an analog computing device and/or a digital computing device.

The computing device 102 further has one or more computer readable media such as the memory area 106. The memory area 106 includes any quantity of media associated with or accessible by the computing device 102. The memory area 106 may be internal to the computing device 102 (as shown in FIG. 1), external to the computing device 102 (not shown), or both (not shown). In some examples, the memory area 106 includes read-only memory and/or memory wired into an analog computing device.

The memory area 106 stores, among other data, one or more applications. The applications, when executed by the processor 104, operate to perform functionality on the computing device 102. Exemplary applications include gaming applications 108 (e.g., gaming application #1 through gaming application #N), mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area 106 further stores application programming interfaces (APIs) 110 and achievement data 114. The APIs 110 expose various functionalities related to the achievements to the gaming applications 108. For example, the gaming application 108 (as shown in FIG. 1) publishes achievement data 114 as well as accesses the achievement data 114 using the APIs 110. A cloud service 112 may interact with the APIs 110 to send information about the achievement data 114 to the gaming application 108. In some examples, the cloud service 112 is further aware of the current context of the user (e.g., the current level of the user in the game) after receiving or obtaining such context (e.g., from the gaming application 108). Based on the current context, the cloud service 112 may instruct the APIs 110 to update the displayed achievement data 114 in the user interface 126. In some examples, based on the current context, the cloud service 112 may instruct the gaming application 108 (e.g., via the APIs 110) to update the displayed achievement data 114 in the user interface 126.

The user interface 126 may be a part of the computing device 102 (e.g., a first computing device), associated with the computing device 102, or external to the computing device 102 (e.g., as a part of a second computing device or associated with the second computing device). In some examples, all portions of the user interface 126 (e.g., game portion 502 and achievement portion 504) may be displayed on the same computing device 102 (e.g., the first computing device). In some other examples, portions of the user interface 126 (e.g., game portion 502 and achievement portion 504) may be displayed on different computing devices (e.g., the game portion 502 is displayed on first computing device and the achievement portion 504 is displayed on a second computing device).

The memory area 106 further stores one or more computer-executable components. Exemplary components include a memory component 116, a context component 118, a user interface component 120, a communications interface component 122, and a help component 124. The memory component 116, when executed by at least one processor causes the at least one processor to access achievement data 114 describing performance of a user in the gaming application 108. The context component 118, when executed by at least one processor causes the at least one processor to filter the accessed achievement data 114 based on a current gaming environment. The current gaming environment comprises contextual criteria such as user preferences, a current gaming level, and/or current progress of the user in the gaming application 108.

The user interface component 120, when executed by at least one processor causes the at least one processor to provide the achievement data 114 filtered by the context component 118 for display to the user during gameplay. In some examples, the user interacts with the gaming application 108 on a first computing device and the user interface component 120 provides the achievement data 114 during gameplay on a second computing device. The configuration of the first computing device and the second computing device may be the same or different. For example, the first computing device may be a gaming console and the second computing device may be a portable computing device (e.g., a tablet, a mobile phone or the like).

In some examples, the user interface component 120 includes a graphics card for displaying data to the user and receiving data from the user. The user interface component 120 may also include computer-executable instructions (e.g., a driver) for operating the graphics card. Further, the user interface component 120 may include a display (e.g., a touch screen display or natural user interface) and/or computer-executable instructions (e.g., a driver) for operating the display. The user interface component 120 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device 102 in a particular way. The term "BLUETOOTH" as used herein refers, in some examples, to a wireless technology standard for exchanging data over short distances using short wavelength radio transmission.

The memory component 116, the context component 118, and the user interface component 120 may execute during gameplay to intermittently, regularly, periodically, on demand, or otherwise, update the achievement data 114 displayed by the user interface component 120. For example, based on a change in available and/or remaining achievements to the user in the current gaming environment, the context component 118 determines whether the presentation of updated achievement data 114 is likely to help the user in that particular level of the gaming application 108. Based on the determination by the context component 118, the user interface component 120 provides the updated achievement data 114 for presentation to the user during gameplay.

The communications interface component 122, when executed by at least one processor causes the at least one processor to intermittently, regularly, periodically, on demand, or otherwise, transmit gaming progress during gameplay to the cloud service 112 for generating the achievement data 114 based on the gaming progress. For example, the gaming progress may be transmitted a predefined number of times during a predefined time period or the gaming progress may be transmitted at the end of a round of the gaming application 108. The processor 104 receives the generated achievement data 114 from the cloud service 112 and provides the received achievement data 114 for display during gameplay. In some examples, the communications interface component 122 includes a network interface card and/or computer-executable instructions (e.g., a driver) for operating the network interface card. Communication between the computing device 102 and other devices may occur using any protocol or mechanism over any wired or wireless connection. In some examples, the communications interface component 122 is operable with short-range communication technologies such as by using near-field communication (NFC) tags.

The help component 124, when executed by at least one processor causes the at least one processor to display (e.g., via the user interface component 120) a reference to instructions for completing one or more achievements available to the user in a current level in the gaming application 108. For example, in the gaming application 108, the reference to instructions for completing one or more achievements available to the user may be "You have killed eight zombies, kill two more zombies to get a new weapon" with instructions for where to find the remaining two zombies.

An exemplary system implementing aspects of the disclosure comprises the user interface 126, the memory area 106, and the processor 104. The user interface 126 may be on a single computing device or on a plurality of computing devices (may be of same or different configurations). For example, different portions of the user interface 126 may be displayed on or by the same computing device or on or by different computing devices. The memory area 106 is associated with the computing device 102 and stores achievement data 114 for a plurality of users. The achievement data 114 describes performance of the plurality of users in the gaming application 108. The processor 104 is programmed to receive a request from one of the plurality of users to display at least a portion of the achievement data 114 during the gameplay. Responsive to the received request, the requested portion of the achievement data 114 from the stored achievement data 114 is provided to the user interface 126 for display during gameplay. The displayed achievement data 114 in the user interface 126 is updated during the gameplay (e.g., in real-time without refreshing). In some examples, the user interface 126 may not be already displaying the achievement data 114 and in this scenario the user interface 126 is updated with the provided achievement data 114. In some other examples, the user interface 126 may be displaying the achievement data 114 and the displayed achievement data 114 is updated in the user interface 126 during the gameplay (e.g., on detecting a change in achievement data 114 based on a current context of the user in the gaming application 108).

The displayed achievement data 114 may be updated during the gameplay by intermittently, regularly, periodically, on demand, or otherwise, transmitting gaming progress during the gameplay to the cloud service 112 for generating the achievement data 114 based on the gaming progress. The generated achievement data 114 is received from the cloud service 112. The received achievement data 114 is provided for display (e.g., on the user interface 126) during the gameplay. In some examples, the user interface 126 includes a snap pane outside the execution context of the gaming application 108. For example, the snap pane may be an achievement application (e.g., different from the gaming application 108) executing on the same computing device or a different computing device. In some examples, the achievement application is considered outside the execution context of the gaming application 108 when any memory area portion accessible (e.g., for writing and/or reading) by the achievement application is not accessible by the gaming application 108. The achievement application may be installed on the computing device 102 from an online marketplace (e.g., an application store).

The processor associated with the system is further programmed to filter the achievement data 114 based on contextual criteria to generate a set of achievements (e.g., requested achievement data 114) relevant to a current gaming environment. In response to the request of the user for achievement data 114, the set of generated achievements is provided for display to the user during the gameplay.

Figure 2:
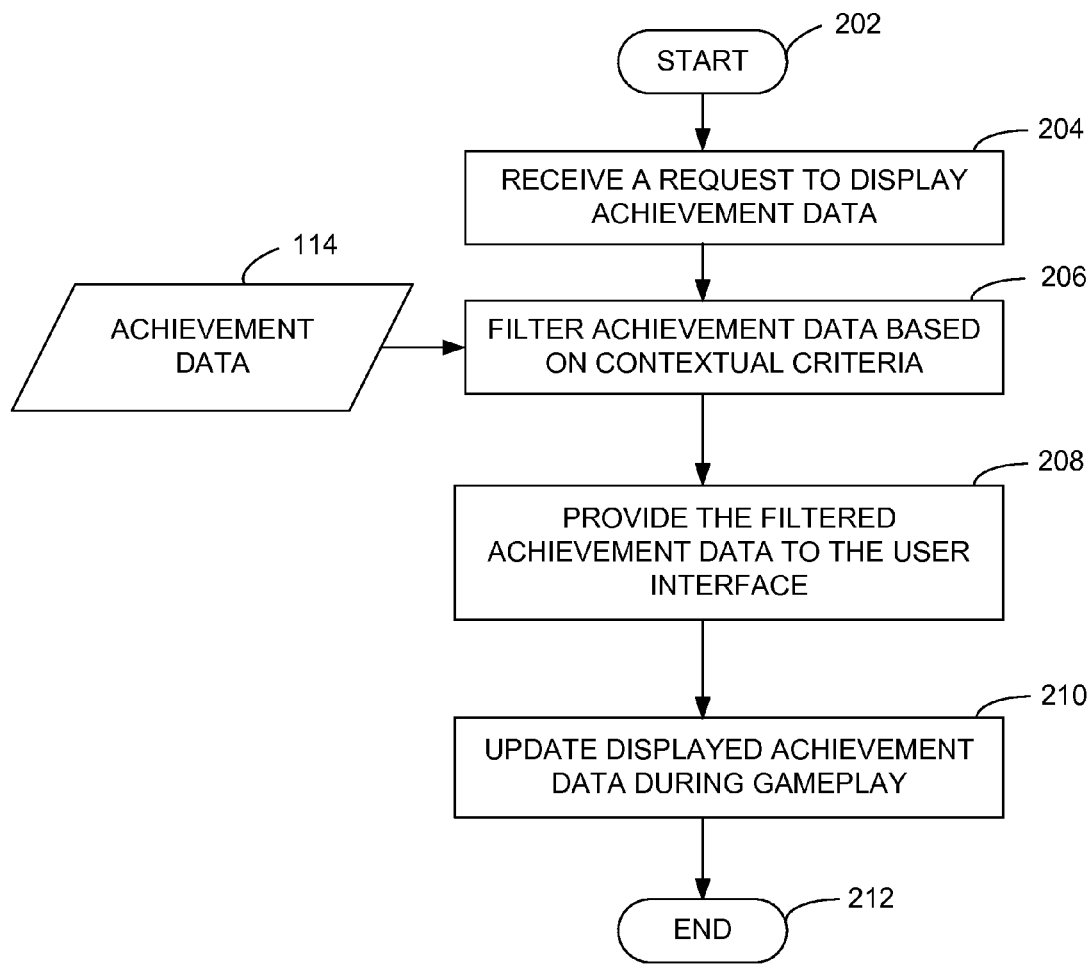
FIG. 2 is an exemplary flow chart illustrating operation of the computing device to update the displayed achievement data during gameplay.

Referring next to FIG. 2, the exemplary flow chart illustrates operation of the computing device 102 to update the displayed achievement data 114 during gameplay. At 202, operations performed by the processor 104 associated with the computing device 102 start. At 204, a request is received to display achievement data 114. For example, the request is received from a user to display at least a portion of achievement data 114 for at least one user. The achievement data 114 describes performance of the user in the gaming application 108. In some examples, the achievement data 114 may represent system-level achievement data 114 such as in-game achievements (e.g., for a plurality of gaming applications) monitored, tracked, stored, or otherwise maintained outside the gaming application 108 (e.g., by the cloud service 112). For example, the user may have interacted with or may have played a plurality of gaming applications (e.g., a certain set of applications within a predefined time period, such as the last two days). In this scenario, the achievement data 114 is derived, calculated, or otherwise determined from data aggregated from the plurality of gaming applications. For example, an achievement may include killing five zombies in a first gaming application and winning four races in a second gaming application. In these examples, the system-level achievements are not limited to the game being played by the user, and the challenges may be defined outside the context of the game being played.

Responsive to the received request, the achievement data 114 is obtained, generated, calculated, and/or derived from data describing performance of the user (e.g., received from the gaming applications 108 and/or other applications). At 206, the achievement data 114 is filtered based on contextual criteria. The achievement data 114 may comprise a set of achievements and user progress relating thereto. Filtering the achievement data 114 based on the contextual criteria comprises surfacing one or more achievements (e.g., achievements available to be met in a current level being played by the user in the gaming application 108) relevant to a current context of the gaming application 108 played by the user. In some examples, only achievements relevant to the current level in the gaming application 108 are displayed. Filtering the achievement data 114 based on the contextual criteria may include sorting the achievements based on the contextual criteria such as a progress of the user, user preferences, and/or a gamer score of the user. Some examples sort the achievements based on actions taken by the user in the game and/or based on statistics accumulated during gameplay.

At 208, the filtered achievement data 114 is provided to the user interface 126 for display during the gameplay. For example, the achievement data 114 may be provided for display on another computing device (e.g., a mobile computing device that is different from the computing device 102 with which the user interacts for playing the game in the gaming application 108). The displayed achievement data 114 is updated at 210 by the computing device 102 (e.g., in real-time, without manual input from the user). In some examples, the displayed achievement data 114 may be updated by the cloud service 112. At 212, the operations performed by the processor 104 associated with the computing device 102 end, such as when the gameplay completes.

In some examples, the operations performed by the processor 104 associated with the computing device 102 further include providing a set of APIs 110 to applications (e.g., the gaming application 108) executing on the computing device 102 and to the cloud service 112. The set of APIs 110 provides access to the achievement data 114 (e.g., to the gaming application 108). The set of APIs 110 may also allow the gaming application 108 to provide gaming progress during the gameplay to the cloud service 112 which determines the achievements, and provides the achievement data 114, based on the provided gaming progress, for display (on the user interface 126) to the computing device 102 during gameplay (e.g., in real-time).

Figure 3:
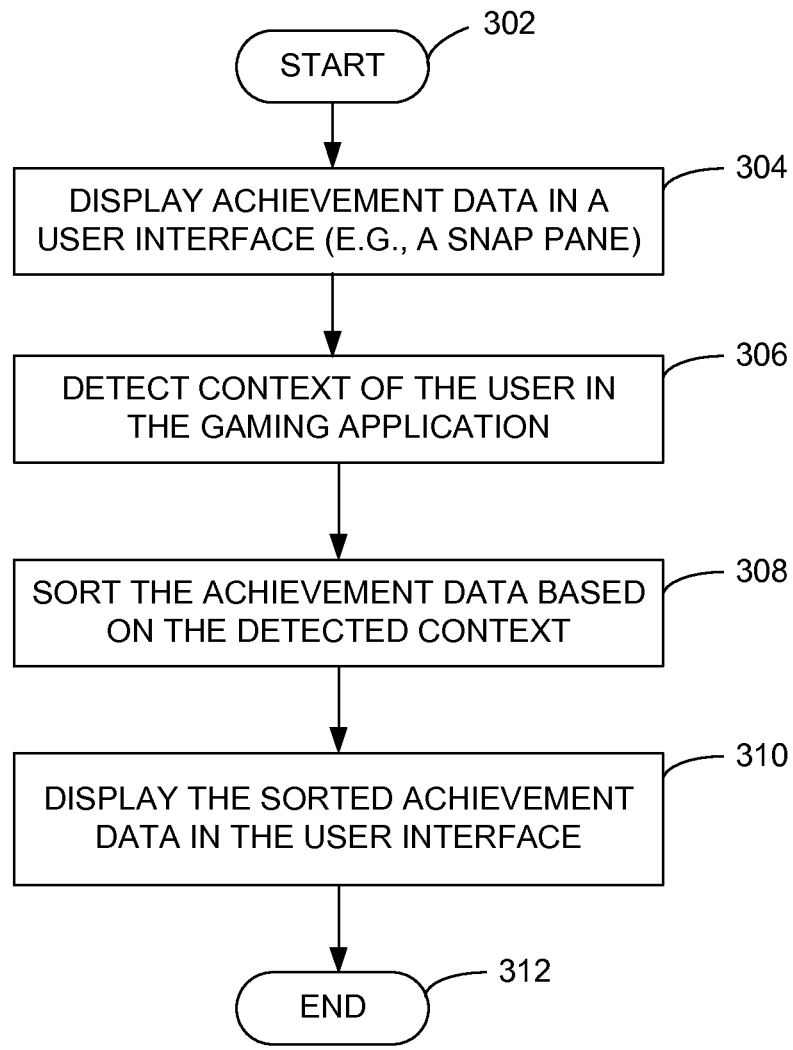
FIG. 3 is an exemplary flow chart illustrating operation of the computing device to display sorted achievement data in a user interface.

Referring next to FIG. 3, the exemplary flow chart illustrates operation of the computing device 102 to display sorted achievement data 114 in the user interface 126. At 302, operations performed by the processor 104 associated with the computing device 102 start. At 304, the achievement data 114 is displayed in the user interface 126 (e.g., in the snap pane). In some examples, only the relevant achievement data 114 may be displayed in the user interface 126 as per the aspects of the disclosure. At 306, the context of the user in the gaming application 108 is detected. The context of the user may comprise a current level the user is playing in the gaming application 108, proficiency level of the user (e.g., novice, medium, or expert etc.), and requirements of the user to complete the current level (e.g., a speed gun may be needed to complete the current level). At 308, the achievement data 114 is sorted based on the detected context of the user in the gaming application 108. For example, if the user is playing in level two of the gaming application 108, achievement data 114 related to level two is ranked higher than the achievement data 114 related to the other levels (e.g., level one). At 310, the sorted achievement data 114 is displayed in the user interface 126 (e.g., the earlier displayed achievement data 114 at 304 is updated with the sorted achievement data 114). At 312, the operations performed by the processor 104 associated with the computing device 102 end (e.g., when the gameplay completes).

Figure 4:
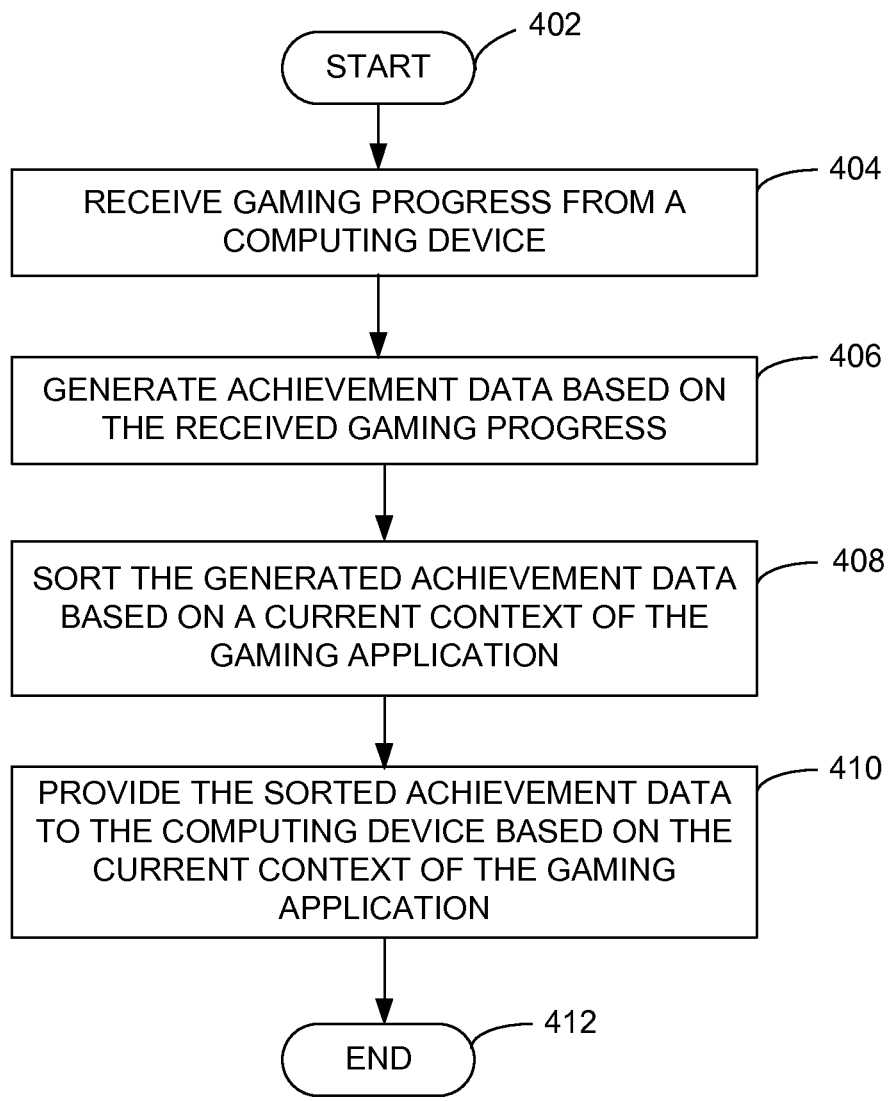
FIG. 4 is an exemplary flow chart illustrating operation of providing the sorted achievement data to the computing device based on current context of a gaming application.

Referring next to FIG. 4, the exemplary flow chart illustrates operation of providing the sorted achievement data 114 to the computing device 102 based on a current context of the gaming application 108. At 402, operations performed by the processor 104 associated with the computing device 102 start. At 404, gaming progress is received from the computing device 102. The gaming progress represents progress made by the user while playing in the gaming application 108. For example, the user is in level two of the game and has already taken five of the seven achievements available for that level (e.g., for completing the level). As another example, the gaming progress may be that the user has completed five of the seven challenges (e.g., with five minutes remaining) in the current level. At 406, achievement data 114 is generated based on the received gaming progress. The generated achievement data 114 may be system-level achievement data 114. For example, the system-level achievement data 114 represents in-game achievement data 114 for one or more gaming applications generated by an application different from the gaming applications, or generated by the cloud service 112. In some examples, the achievement data 114 may be generated based on gaming progress received from a plurality of computing devices (e.g., tablet, notebook, and mobile telephone of the user).

At 408, the generated achievement data 114 is sorted based on a current context of the gaming application 108. The current context of the gaming application 108 may be determined from one or more of the following: the progress of the user in the gaming application 108, progress of other users in the gaming application 108, the current level that the user is playing in the game, proficiency level of the user, and the like. At 410, the sorted achievement data 114 is provided to the computing device 102 based on the current context of the gaming application 108. For example, the sorted achievement data 114 is provided to the computing device 102 only if there is a need or desire for the user to know about the achievement data 114 at that time (e.g., the achievement data 114 is relevant to the user at that moment). The achievement data 114 may be provided to the user via the user interface 126, audio output (e.g., through speakers), and/or other means. At 412, the operations performed by the processor 104 associated with the computing device 102 end.

Figure 5A:
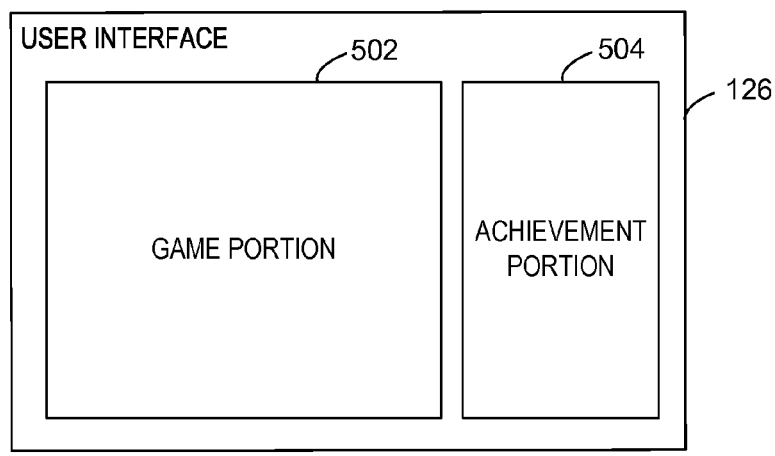
FIGS. 5A, 5B, and 5C illustrate exemplary user interfaces for displaying achievement data.
Figure 5B:
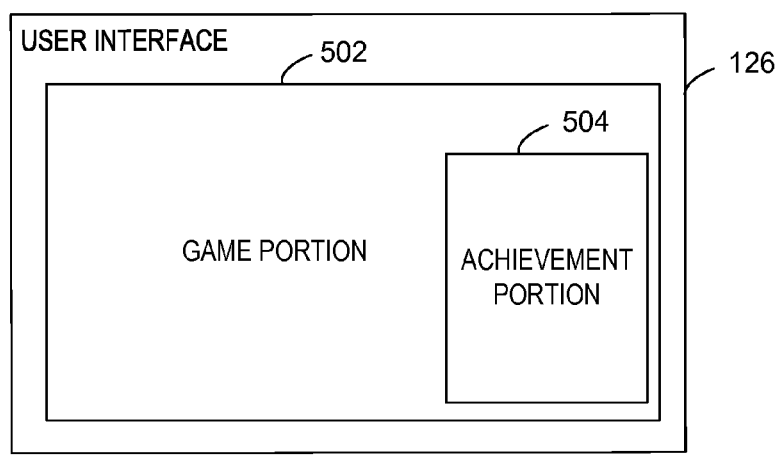
Figure 5C:
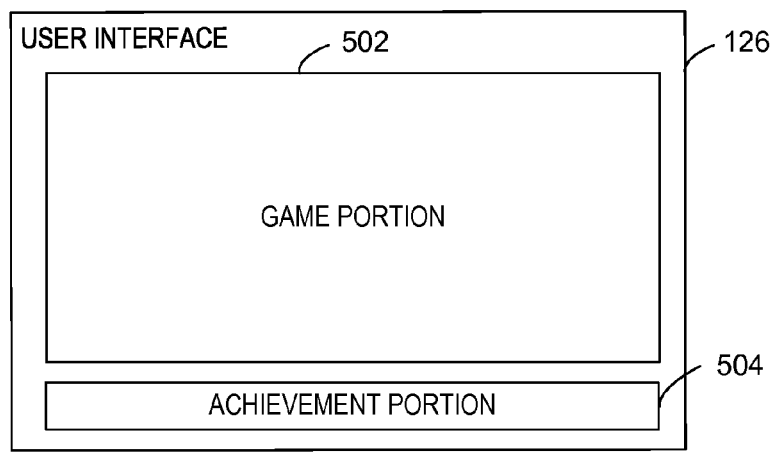

FIGS. 5A, 5B, and 5C illustrate exemplary user interfaces 126 for displaying achievement data 114 in some examples. For example, in FIG. 5A, the game portion 502 and achievement portion 504 are shown separately (e.g., side-by-side of each other) in the user interface 126. In FIG. 5B, the achievement portion 504 overlays over the game portion 502 in the user interface 126 and may be partially transparent. In FIG. 5C, the game portion 502 and achievement portion 504 are shown separately (e.g., side-by-side of each other) in a different configuration than FIG. 5A in the user interface 126. Other variations of displaying the game portion 502 and the achievement portion 504 in the user interface 126 are also within scope of this disclosure. For example, the game portion 502 may be displayed in the user interface 126 associated with the computing device 102 on which the user is playing the game and the achievement portion 504 may be displayed on another computing device (e.g., a mobile computing device).

The proportion of the game portion 502 and the achievement portion 504 may vary based on user preference, the gaming application 108, and the current context of the user in the gaming application 108. For example, if the entire game portion 502 includes relevant content which the user should see then a scaling or overlapping of the game portion 502 with the achievement portion 504 may be undesirable and in such a scenario the achievement portion 504 (or a portion thereof) may be displayed on another computing device.

Figure 6:
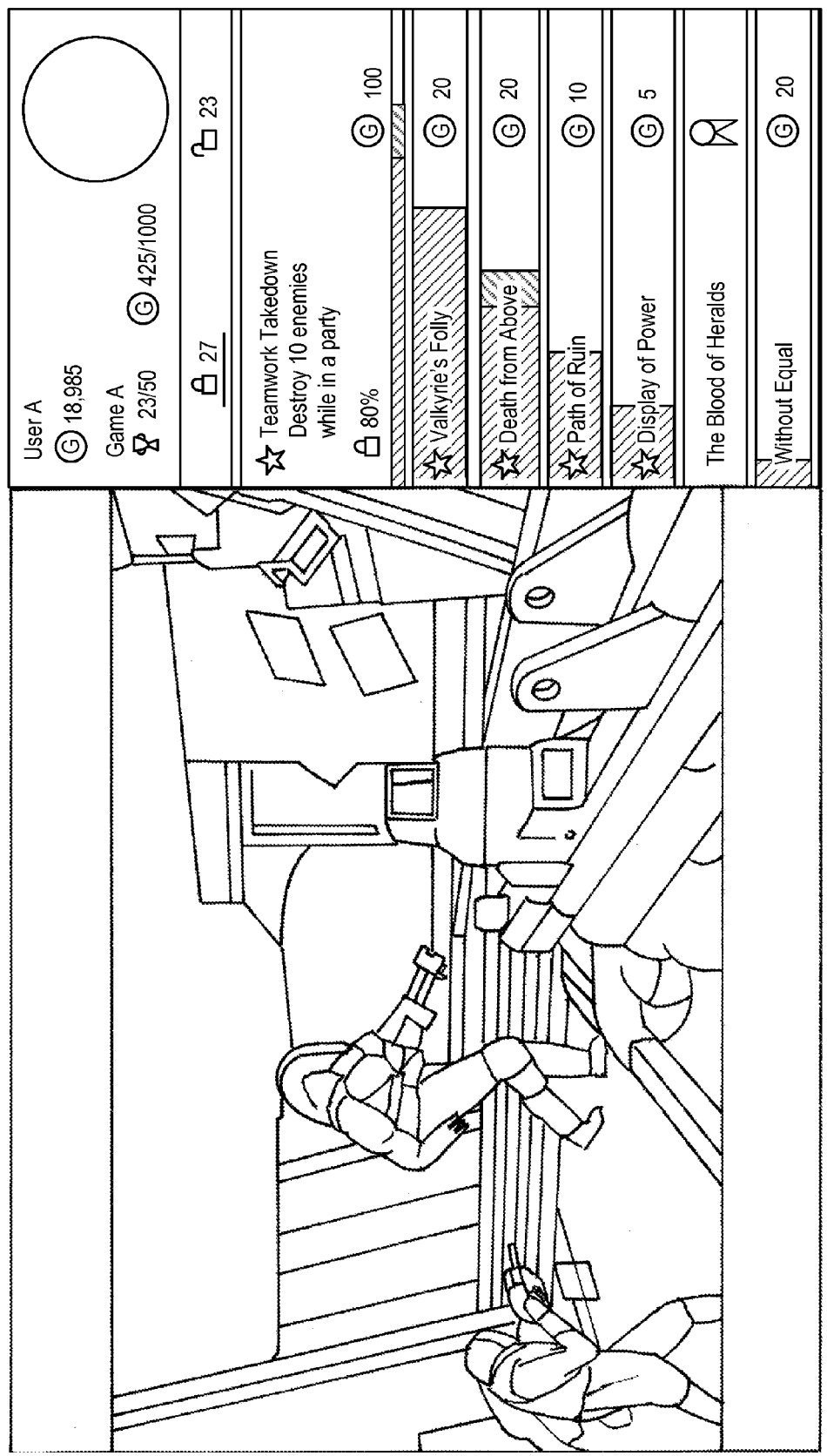
FIG. 6 illustrates an exemplary achievements application showing achievement data next to a gaming application during gameplay.

Referring next to FIG. 6, an exemplary achievements application shows achievement data 114 next to the gaming application 108 during gameplay. For example, the achievements application user interface pane is snapped next to a game display. As the user plays the game, the user is able to monitor achievement progress in real-time. The achievements list is based on progress for the achievements of individual users. For example, the progress bar for each achievement may have at least two components: one component indicating recent progress (during the current game or gaming session) and one component indicating older progress (during a previous game or gaming session). While shown with hash marks in FIG. 6, those skilled in the art will note that the two components may be distinguished from one another in numerous ways. For example, one component may be represented by one color or shade of color, while the other component may be represented by another color or another shade of color. Achievements may be highlighted to show achievements relevant to what the user is doing in the game.

Figures 7A, 7B:
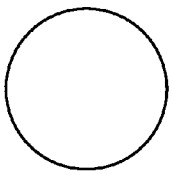
FIG. 7A and FIG. 7B illustrate exemplary locked and unlocked achievements, respectively.

Referring next to FIG. 7A and FIG. 7B, exemplary locked and unlocked achievements are illustrated, respectively. An exemplary locked tab sort order is:

- Tracked achievements—sorted by progress
- Challenges—sorted by progress
- Untracked achievements—sorted by progress
- Achievements with no progress
- Secret achievements The examples in FIG. 7A and FIG. 7B for achievement data 114 display various exemplary achievement data and allow the user to navigate the achievements. For example:

- List results based on real-time progress updates
- Secondary progress bar fills up in real-time to indicate new progress
- Primary progress bar "catches up" to the secondary position once the snap gets focus and then loses the focus (e.g., when the user is done with checking the status, the user goes back to the game)
- Selecting an achievement via a gaming controller goes to the details page
- The user may navigate tabs shown in the user interface via the gaming controller. For example, left/right buttons and left/right bumpers switch among the tabs. The user may also focus on tabs and press another button.

As an example, the unlocked achievements may be sorted by displaying the most recently unlocked achievements at the top. As an example, the locked achievements may be sorted by displaying the locked achievements with the most progress at the top.

Figure 8A:
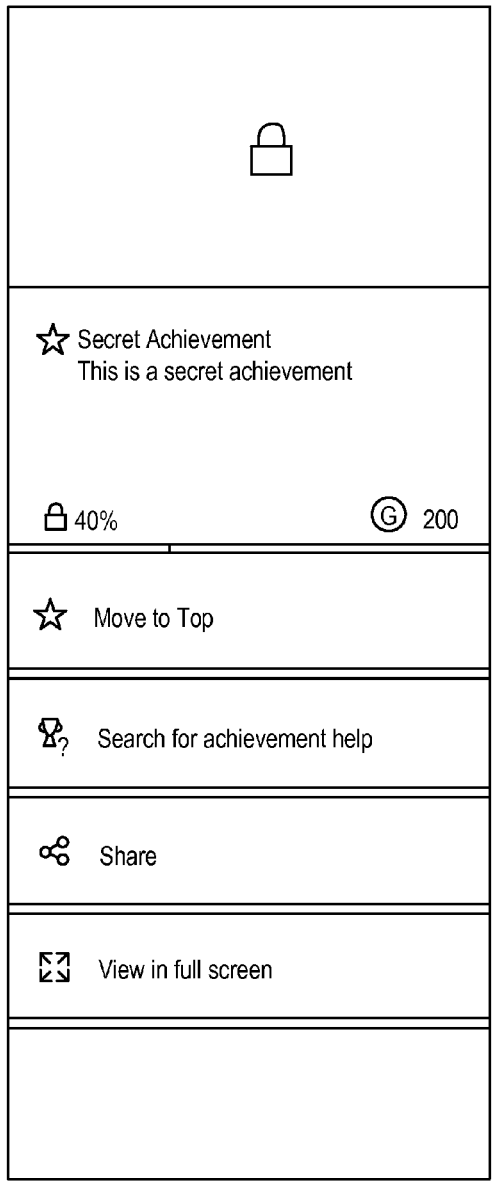
FIG. 8A and FIG. 8B are exemplary diagrams illustrating achievement details for a locked achievement.
Figure 8B:
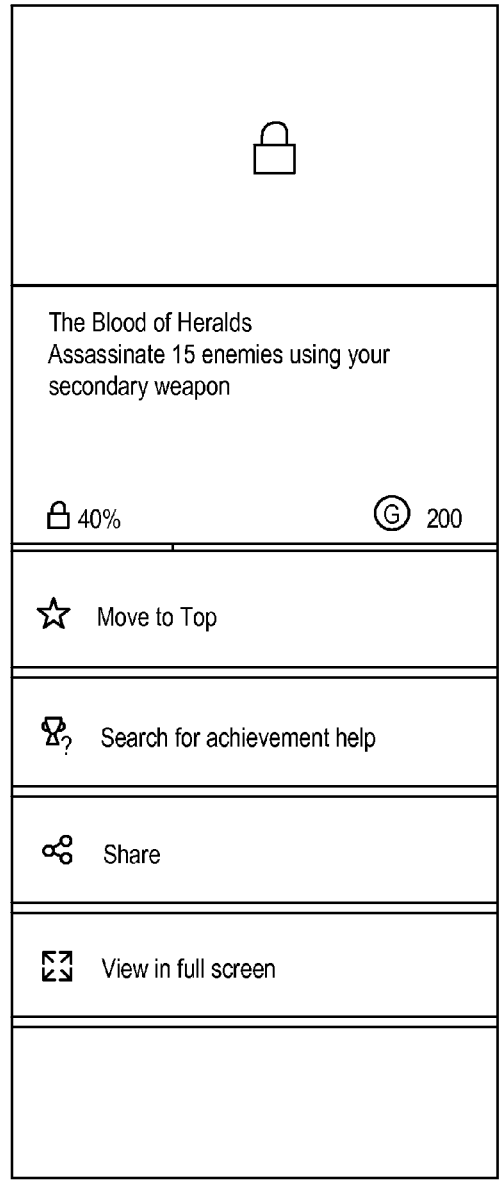

Referring next to FIG. 8A and FIG. 8B, the exemplary diagram illustrates achievement details for a locked achievement, with or without a reward available. In these examples:

- The "Move to top" option moves the achievement to the top section of the list
- "Search for achievement help" option launches a browser to issue a search query for "game name", "achievement name", or other relevant search terms.
- "Share" option shares this achievement, such as by electronic mail, text message, or social media (e.g., posting to a web page). Sharing a locked achievement is helpful for asking friends for help. Sharing an unlocked achievement may prompt other users to give accolades or ask questions about how to complete the achievement.
- "View in full screen" option launches the details page for this achievement in full screen.

An exemplary implementation of the logic and functionality for providing the display and updating of system-level achievements is next described. Any combination of the following is within the scope of the disclosure, and may be available in the snapped achievement application (e.g., a portion of the game screen) or full screen. Some implementations automatically connect to the game. For example, the implementation knows what game is being played (e.g., detects execution of the game) and automatically loads the achievements, challenges, and statistics associated with the game. Some implementations sort game achievements by percentage complete, or otherwise by how close the user is to accomplishing the achievements. Some implementations bubble up, or rank higher, achievements on which the user is making progress. As an example, a "kill 100 zombies" achievement temporarily bubbles up to the top of the list of achievements whenever the user makes progress towards that achievement (e.g., kills a zombie). Some implementations bubble up achievements that are relevant to what the user is doing in the game. For example, if the user is on level two of a game and there is an achievement for completing level two, or collecting 100 items in level two, one or more of those achievements are bubbled up to the top of the list while those achievements are relevant. Some implementations show relevant challenges for the game the user is playing. For example, when challenges are active for the game the user is playing, those challenges are highlighted in the snapped application (e.g., the achievements application displaying the achievement data). Some examples keep the user updated with real-time progress on their achievements. For example, when the user kills a zombie, the completion percentage on the "kill 100 zombies" achievement is updated in real-time. Some implementations celebrate when the user has accomplished an achievement. For example, when the user accomplishes an achievement, an achievement unlocked toast (e.g., popup, or other user interface element) is displayed, but the moment is also celebrated in the user interface pane of the snapped achievement application. For example, the unlocked achievement may move to the top of the list, fireworks are set off, achievement art is shown, etc.

For example, the scenario of filtering or bubbling up the relevant achievements may be based on what the user is doing in-game (e.g., playing on level two, using a specific weapon, fighting a specific type of enemy, etc.). For example, when defining or configuring the achievements, achievement metadata may be marked (e.g., by a game developer) with a set of tags (e.g., store the tags in a field of the achievement metadata). Exemplary tags for "kill 100 zombies" may be "zombies". Exemplary tags for achievement "travel 10 miles" may be "walking", "driving", "flying", and "boating." Exemplary tags for achievement "drive 5 miles in level two" may be "driving" and "level two." The set of tags may be different for different achievements, are based on at least the associated achievements, may be based on other achievements, and may be defined by the game developer, in some examples.

During gameplay or during execution of other applications, the game generates relevant context tags (e.g., for use by the cloud service 112) based on what the user is doing in the game or other application. The context tags may be generated by the game itself or by the cloud service 112 based on information provided by the game. For example, if the user is driving in any level then the context tags may be "driving. As another example, if the user is driving in level two then the context tags may be "driving" and "level two." In still another example, if the user is walking in level two the generated context tags may be "walking" and "level two." The achievements of the user may be monitored (e.g., by the cloud service 112) through the context tags generated during gameplay and comparing these context tags with the tags provided in the achievement metadata (e.g., defined by the game developer). The achievements may be filtered or bubbled up based on the comparison that match the set of tags in achievement metadata with the context tags generated during gameplay. The filtering or bubbling up of the achievements based on the comparison may be user configurable (e.g., at least one achievement matches, all the achievements match, or a predefined number of achievements match). For example, during gameplay if the user is driving in level two (context tag including "driving") may result in filtering or bubbling up the achievements "travel 10 miles" (tags including "walking", "driving", "flying", and/or "boating") and "drive 5 miles in level two" (tags including "driving" and "level two"). As another example, if the user is walking in level two (context tags including "walking" and "level two") may or may not result in filtering or bubbling up one or more of the achievements "travel 10 miles" (tags including "walking", "driving", "flying", and "boating") and "drive 5 miles in level two" (tags including "driving" and "level two").

Some implementations launch into the snapped achievement application when the user interacts with an achievement toast. For example, when the user is playing a game and accomplishes an achievement and wants to see more details about the achievement, a reduced size version of the achievement application is launched instead of the full screen achievements application so that the user is not completely taken out of the game experience. Some implementations allow optional sorting by name and gamer score. For example, while "by progress" sorting is helpful for finding or searching for achievements and other reasons, the user may want to sort alphabetically to find a particular achievement, or by gamer score to look for the most valuable achievements. Some implementations allow optional sorting by friend or community achievement rarity. For example, the user is able to sort by the rarity of an achievement so that the user knows which achievements are easy to get and which ones are more difficult. Some implementations allow the user to pin an achievement in progress to the top of the list. For example, when the user is working on a particular achievement, the user may pin the achievement to the top of the list in the snapped application for easy viewing. Some implementations show the user what friends are currently playing this game. These implementations may show the user who else is currently playing this game, so that the user may jump in and earn achievements together with that user. Some implementations show the user when a friend of the user accomplishes an achievement for this game. This helps the user stay competitive with their friends by highlighting "just completed" and/or "recently completed" achievements by the friends in this game. Some implementations show the user extra details for a particular achievement. For example, if the user hovers over or selects an achievement, the user is shown extra details such as rewards the user will earn, friends who accomplished this achievement, and/or rarity of the achievement.

Some implementations automatically search the web for help on an achievement. For example, if the user is having trouble with a particular achievement, these implementations automatically launch a browser for the user with a well-defined search string such as "GAME A achievement help". Some implementations show game digital video recorder (DVR) clips related to this achievement. For example, if the user is having trouble on an achievement, the user is shown game DVR clips tagged with this achievement so that the user may see how other people have completed the achievement. When not connected to a game, some implementations let the user browse through a list of all of the games and achievements of the user. For example, when the user is not searching for achievements in a game, the user may browse through the achievements lists of other games the user owns. Some implementations show the user completion details for the game the user is playing. For example, while the user is searching for achievements, these implementations show the user basic game details such as game name, achievement/gamer score completion, and/or game completion. Some implementations show the user gamer score details associated with the user. For example, these implementations show the gamertag (or other user identifier) and gamer score (or other data representing gaming performance and history of the user) of the user so that the user may note when the user crosses important milestones.

Some examples contemplate the cloud service 112 or other server storing the achievement data 114. The computing device 102 communicates with the cloud service 112 (e.g., via the APIs 110) to obtain and store portions of the achievement data 114 (e.g., the portions needed or desired by the user(s) of the computing device 102). In some examples, a game executing on the computing device 102 sends gaming progress to the cloud service 112. The achievements application executing on the computing device 102 connects to the cloud service 112 (e.g., via the APIs) to obtain real-time updates for display to the user.

While some aspects of the disclosure have described achievements with reference to the gaming application 108, the disclosure applies to other types of applications as well. For example, for a media player application, an achievement is "watching ten action movies." If the user achieves this goal defined as an achievement, the user may be provided with an incentive (e.g., the next movie may be shown for free).

Additional Examples

Requests received, by the computing device 102, from the user may be automatically generated based on the context of the user and/or the gaming progress (e.g., in last predefined time period—such as in the last two minutes) in the gaming application 108. For example, if the user has not been able to complete any new achievement in the last two minutes, the achievement data 114 may be updated without an explicit request from the user.

In some examples, group achievements may be displayed in the achievement portion 504. For example, based on their individual gaming progress, achievement data 114 for a plurality of users is displayed in the achievement portion 504 (e.g., the snap pane). The group achievements may be cooperative (e.g., at least two users playing together as a group) or competitive (e.g., at least two users competing against each other).

In an example scenario, the user requests help on how to complete the remaining achievements. The user may request help by pressing a button, issuing a command by touch, gesture, or speech, or by any other means known in the art. In response to the request for help, live help may be provided to the user during gameplay (e.g., in the achievement portion 504). Help may be provided by searching for web clips, videos, etc. for completing the remaining achievements. Help may be displayed in the snap pane (e.g., the video providing help to the user is shown in the snap pane). In some examples, the achievement data 114 is shown live as the computing device 102 tracks gaming progress in real-time (e.g., the computing device 102 tracks one zombie killed in the game and updates the achievement data 114 if this event affects the achievement data 114).

Exemplary achievements are displayed in the snap user interface pane in real-time. The achievements are related to the game (e.g., context of the user in the gaming application 108), as the user progresses towards the achievements. For example, the achievements may be ordered by one or more of the following: progress (e.g., how close you are to accomplishing them), manually (e.g., based on user preference, interest, etc.), achievement rarity (e.g., whether the achievement is easy to achieve or hard to achieve), and/or similarity (e.g., similar achievements that friends have accomplished). The achievements may be sorted and/or filtered based on the current section of the game that the user is on (e.g., the achievements unrelated to the current level are hidden). In some examples, the achievement data 114 (e.g., completed and/or remaining achievements) and gaming progress are represented in a tagging format such as an extensible markup language (XML). Other formats may also be used for representing the achievement data 114 and gaming progress.

The snap pane may display real-time progress of the system-level achievements. For example, the monitoring of achievement progress is performed in real-time based on the context of the user within the gaming application 108. In some examples, the system-level achievements may be surfaced to the user only when the user performs a relevant action in the game. Recent achievement progress may be highlighted to the users in real-time based on the context of the user within the gaming application 108. For example, multiplayer achievements are highlighted when the user is playing a multiplayer game and achievements of the one or more other users are relevant to the user in the current context (e.g., only the relevant achievements of those users are displayed to the user).

Achievements may also be represented by challenges. For example, achievement data 114 may include the challenges that lie ahead for completing the current level. The achievement data 114 may include the challenges completed and/or the challenges that need to be completed for completing the current level. In some examples, the challenges or achievements may be available only for a limited time (e.g., with no gamer score). Exemplary achievements in the achievement portion 504 of the user interface 126 may show session progression. For example, the progress bar may be color-coded to show the current games progress against the progress of the last session. A session may be from game to game or since the last time the user played the game.

Alternatively or in addition to the other examples described herein, examples include any combination of the following:
receiving, by a computing device, a request from a user to display at least a portion of achievement data for at least one user describing performance of the user in a gaming application
responsive to the received request, filtering the achievement data based on contextual criteria
providing the filtered achievement data to a user interface for display during gameplay
updating, by the computing device, the displayed achievement data during the gameplay
providing a set of APIs to applications executing on the computing device, the set of APIs providing access to the achievement data
the achievement data comprising a set of achievements and user progress relating thereto
filtering the achievement data is based on the contextual criteria and comprises surfacing one or more achievements relevant to a current context of the gaming application played by the user
surfacing the one or more achievements includes surfacing one or more achievements available to be met in a current level being played by the user in the gaming application
filtering the achievement data based on the contextual criteria comprises sorting the achievements based on the contextual criteria such as a progress of the user, user preferences, and/or a gamer score of the user
the achievement data represents system-level achievement data
the system-level achievement data represents in-game achievements monitored from outside the gaming application
providing the filtered achievement data comprises providing the filtered achievement data for display on another computing device
the another computing device comprises a mobile computing device of the user
receive a request from one of the plurality of users to display at least a portion of the achievement data during gameplay
responsive to the received request, provide the requested portion of the achievement data from the stored achievement data to the user interface for display during the gameplay
update the displayed achievement data in the user interface during the gameplay
updating the displayed achievement data during the gameplay in real-time
intermittently, regularly, periodically, on demand, or otherwise, transmitting gaming progress during the gameplay to a cloud service for generating the achievement data based on the gaming progress
receiving the generated achievement data from the cloud service
providing the received achievement data for display during the gameplay
filtering the achievement data based on contextual criteria to generate a set of achievements relevant to a current gaming environment, and providing the requested achievement data by providing the set of achievements for display to the user during the gameplay
the user interface comprises a snap pane outside an execution context of the gaming application
the memory component accesses achievement data describing performance of a user in a gaming application
the context component filters the accessed achievement data based on a current gaming environment
the user interface component provides the achievement data filtered by the context component for display to the user during gameplay
wherein the memory component, the context component, and the user interface component execute during the gameplay to intermittently, regularly, periodically, on demand, or otherwise, update the achievement data displayed by the user interface component

- the current gaming environment comprises contextual criteria such as user preferences, a current gaming level, and/or current progress of the user in the gaming application
- the communications interface component intermittently, regularly, periodically, on demand, or otherwise, transmits gaming progress during the gameplay to a cloud service for generating the achievement data based on the gaming progress
- the communications interface component receives the generated achievement data from the cloud service and provide the received achievement data for display during the gameplay
- the help component displays, via the user interface component, a reference to instructions for completing one or more achievements available to the user in a current level in the gaming application
- the user interacts with the gaming application on a first computing device and the user interface component provides the achievement data, during the gameplay, on a second computing device At least a portion of the functionality of the various elements in FIGS. 2, 3, and 4 may be performed by other elements in FIG. 1, or an entity (e.g., processor, web service, server, application program, computing device, etc.) not shown in FIG. 1.

In some examples, the operations illustrated in FIGS. 2, 3, and 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when configured to execute the instructions described herein.

The examples illustrated and described herein as well as examples not specifically described herein but within the scope of aspects of the disclosure constitute exemplary means for filtering the achievement data 114 based on contextual criteria. For example, the elements illustrated in FIG. 1, such as when encoded to perform the operations illustrated in FIG. 2, constitute exemplary means for receiving, by the computing device, a request from the user to display at least a portion of achievement data 114 for at least one user describing performance of the user in the gaming application, exemplary means for filtering the achievement data 114 based on contextual criteria in response to the received request, exemplary means for providing the filtered achievement data 114 to the user interface 126 for display during gameplay, and exemplary means for updating, by the computing device, the displayed achievement data 114 during gameplay.

Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip (SOC) implementations, complex programmable logic devices (CPLDs), etc.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving, by a computing device, a request from a user to display at least a portion of achievement data for the user describing performance of the user in a gaming application;
   responsive to the received request, filtering the achievement data based on contextual criteria;
   providing the filtered achievement data to a user interface for display during gameplay; and
   updating, by the computing device, the displayed achievement data during gameplay by: intermittently transmitting gaming progress during the gameplay to a cloud service for generating the achievement data based on the gaming progress, receiving the generated achievement data from the cloud service, and providing the received achievement data for display during the gameplay.

2. The method of claim 1, further comprising providing a set of application programming interface (APIs) to applications executing on the computing device, the set of APIs providing access to the achievement data.

3. The method of claim 1, wherein the achievement data comprises a set of achievements and user progress relating thereto, and wherein filtering the achievement data based on the contextual criteria comprises presenting one or more achievements relevant to a current context of the gaming application played by the user and one or more previous achievements relevant to at least one other application.

4. The method of claim 3, wherein presenting the one or more achievements comprises presenting one or more achievements available to be met in a current level being played by the user in the gaming application.

5. The method of claim 1, wherein the achievement data comprises a set of achievements and user progress relating thereto, and wherein filtering the achievement data based on the contextual criteria comprises sorting the achievements based on the contextual criteria selected from a group consisting of a progress of the user, user preferences, and a gamer score of the user.

6. The method of claim 1, wherein the achievement data represents system-level achievement data.

7. The method of claim 6, wherein a portion of the system-level achievement data represents in-game achievements monitored from outside the gaming application.

8. The method of claim 1, wherein providing the filtered achievement data comprises providing the filtered achievement data for display on another computing device.

9. The method of claim 8, wherein the another computing device comprises a mobile computing device of the user.

10. A system comprising:
    a user interface;
    a memory area associated with a computing device, said memory area storing achievement data for a user describing performance of the user in a gaming application; and
    a processor programmed to:
      receive a request from the user to display at least a portion of the achievement data during gameplay;
      responsive to the received request:
        filtering the achievement data based on contextual criteria; and
        provide the requested portion of the achievement data from the stored achievement data to the user interface for display during the gameplay; and
      update the displayed achievement data in the user interface during the gameplay by: intermittently transmitting gaming progress during the gameplay to a cloud service for generating the achievement data based on the gaming progress, receiving the generated achievement data from the cloud service, and providing the received achievement data for display during the gameplay.

11. The system of claim 10, wherein the processor is programmed to update the displayed achievement data during the gameplay in real-time.

12. The system of claim 10, further comprising means for filtering the achievement data based on contextual criteria.

13. The system of claim 10, wherein the processor is programmed to provide the requested achievement data by providing the set of achievements for display to the user during the gameplay.

14. The system of claim 10, wherein the user interface comprises a snap pane outside an execution context of the gaming application.

15. One or more computer storage media embodying computer-executable components, said components comprising:
    a memory component that when executed by at least one processor causes the at least one processor to access achievement data describing performance of a user in a gaming application;

a context component that when executed by at least one processor causes the at least one processor to filter the accessed achievement data based on a current gaming environment;

a user interface component that when executed by at least one processor causes the at least one processor to provide the achievement data filtered by the context component for display to the user during gameplay; and a communications interface component that when executed by at least one processor causes the at least one processor to intermittently transmit gaming progress during the gameplay to a cloud service for generating the achievement data based on the gaming progress, receive the generated achievement data from the cloud service, and provide the received achievement data to the user interface component for display during the gameplay.

16. The computer storage media of claim 15, wherein the current gaming environment comprises contextual criteria selected from a group consisting of user preferences, a current gaming level, and current progress of the user in the gaming application.

17. The computer storage media of claim 15, further comprising a help component that when executed by at least one processor causes the at least one processor to display, via the user interface component, a reference to instructions for completing one or more achievements available to the user in a current level in the gaming application.

18. The computer storage media of claim 15, wherein the user interacts with the gaming application on a first computing device and the user interface component provides the achievement data, during the gameplay, for display on a second computing device.

19. The system of claim 10, wherein the achievement data comprises a set of achievements and user progress relating thereto, and wherein filtering the achievement data based on the contextual criteria comprises sorting the achievements based on the contextual criteria selected from a group consisting of a progress of the user, user preferences, and a gamer score of the user.

20. The computer storage media of claim 15, wherein the achievement data comprises a set of achievements and user progress relating thereto, and wherein filtering the achievement data based on the contextual criteria comprises sorting the achievements based on the contextual criteria selected from a group consisting of the current progress of the user, user preferences, and a gamer score of the user.

* * * * *